Aug. 25, 1970 — T. G. MADDEN — 3,525,202
COTTON PICKING SPINDLE
Filed June 21, 1968
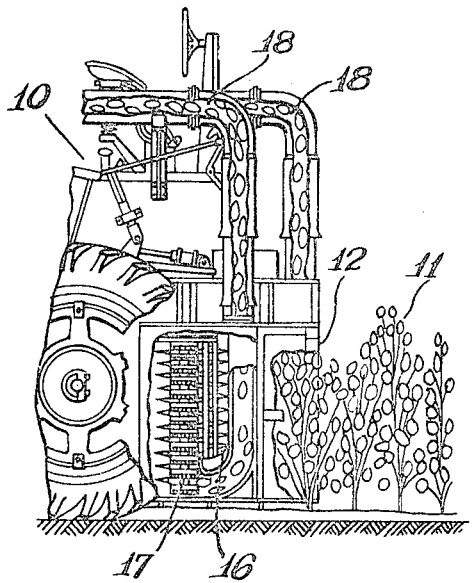
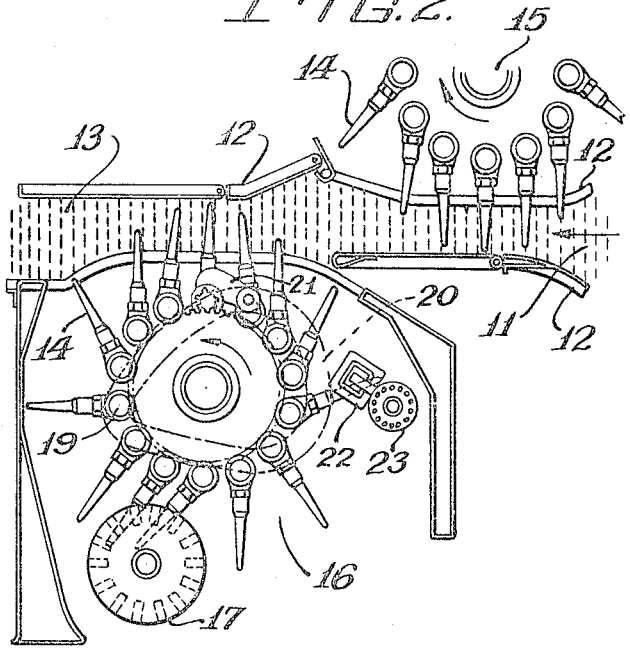
DIRECTION OF MACHINE TRAVEL
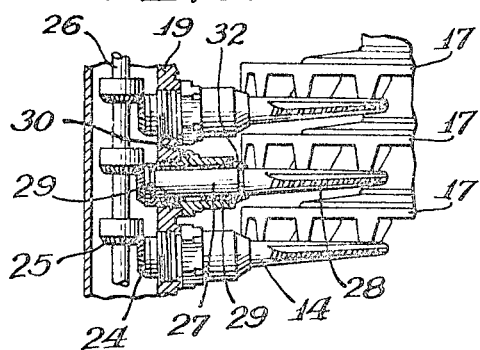
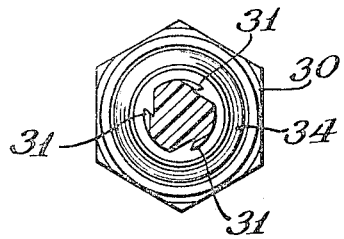
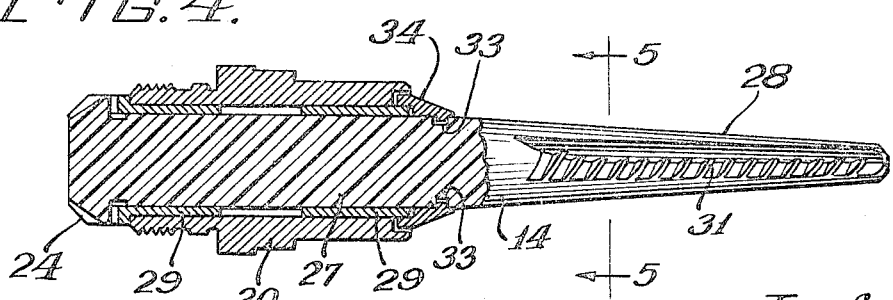
Inventor:
Thomas G. Madden
By Bair, Freeman & Molinare
Attys.

__United States Patent Office__

3,525,202
Patented Aug. 25, 1970

3,525,202
COTTON PICKING SPINDLE
Thomas G. Madden, Palos Heights, Ill., assignor to Maco Industries, Inc., a corporation of Illinois
Filed June 21, 1968, Ser. No. 738,874
Int. Cl. A01d 45/18
U.S. Cl. 56—50    8 Claims

ABSTRACT OF THE DISCLOSURE

A cotton picker spindle, which is made from a tough and elastic synthetic material, having a durometer hardness, ranging from about 80 Shore A to 80 Shore D, comprising a central shaft portion, means connected to the shaft portion for engagement with a rotating means to rotate the spindle, a teeth-bearing portion connected to the shaft portion for plucking the cotton, and a circumferential groove on the spindle for retaining a snap-on collar for a bushing.

BACKGROUND OF THE INVENTION

This invention relates to a novel cotton picking device. More particularly, the invention relates to a novel cotton picker spindle which is adapted to mechanically remove cotton form the boll of a cotton plant.

Cotton harvesting machines are made by mounting picking drums onto a tractor-like vehicle. Inside the drums, vertical picking bars are mounted and rotated around a cam. Each picking bar is, in turn, equipped with a number of horizontally mounted cotton picker spindles for actually plucking the cotton from a cotton plant. The cotton plant is guided into a picking zone between the drums by plates and other guiding means. As the picking bars move to a position near the picking zone, the spindles mounted thereon reach into the picking zone to come into contact with the cotton plants. A plurality of rows of teeth are provided on the picking portion of each of the spindles. A rotary motion is imparted to the spindle by suitable means so that when the teeth come into contact with cotton, they grip the same. After the cotton is plucked from the plant by the spindle, the spindle passes through a doffer which removes the cotton from the spindle.

The cotton picker pindles of the prior art are generally made with hardened steel. Such spindles suffer a number of disadvantages. For example, a cotton picking machine is normally only used for a short period of time during the year and is inactive in the remainder of the year. When steel spindles are inactive and subject to the corrosive actions of atmosphere and weather elements, including high humidity, they rapidly deteriorate and rust. For this reason, they cease to function properly and frequently must be replaced each year before the cotton picking season. Moreover, as is the case with any machinery on a farm, these hardened steel spindles periodically come into contact with hard objects such as rock, wood and metal objects. When a steel spindle hits a large piece of rock, it may be damaged or broken. A damaged or broken spindle is not only ineffective for the purpose of picking cotton, it is also a hazard to the remaining portions of the cotton picker machine. Thus, a damaged spindle may impinge upon various guides, plates and other parts of the machine such as the moisture distributor and the rubber doffers. Thus damaged or broken spindles must be replaced and frequently the drive gear is also damaged or broken and must be similarly replaced. Such repair and maintenance work on the spindles is very time-consuming and must be carried out in the field under adverse conditions. The magnitude of the problem is multiplied since there are several hundred spindles in each cotton picking machine.

It is therefore, an object of the present invention to provide an improved cotton picker spindle for use in a mechanical cotton harvesting machine.

It is another object of the invention to provide a novel cotton picker spindle which is tough, elastic, has the requisite hardness, and the proper abrasion resistance to retain the sharp picking edges to remove cotton from a cotton plant but permits the doffers to remove the cotton therefrom, and is resistant to weather and other atmospherical elements.

Further objects of the invention may be gathered from a reading of the following description.

SUMMARY OF THE INVENTION

In accordance with the present inveniton, there is provided a cotton picker spindle which is made from a tough and elastic synthetic material having a durometer ranging from about 80 Shore A to 80 Shore D, and having a coefficient of friction suitable for plucking cotton from a cotton plant but permitting the removal of cotton by doffers. Surprisingly, I have found that polyurethane is unique in possessing all the desirable qualities for the material of construction for a cotton picker spindle. Thus, although substantial amount of difficulties have been encountered with hardened steel spindles of the prior art, to my knowledge there has been no attempt to make an improved cotton picker spindle from a superior material. I have discovered that when a cotton picker spindle is made from polyurethane, or another material possessing hardness and abrasion resistance similar to those of polyurethane, the spindle has the requisite toughness or resistance to wear, elasticity, durometer property, and the necessary coefficient of friction so as to permit the plucking of the cotton from a plant and the removal of the plucked cotton from the spindle by a doffer.

A cotton picker spindle made from polyurethane, or another material having the above noted properties, is also substantially immune to various weather and corrosive conditions. Thus, there is a substantial savings in labor at the beginning of the season in that several hundred spindles in a cotton picker machine need not be individually replaced or repaired. A further and very important advantage of the spindle of the present invention resides in the fact that the steel spindles of the prior art must be specially made of special chrome plated alloy steel having the requisite hardness, which necessitates a high cost per spindle. Polyurethane spindles of the present invention can be molded and thus are much more economical than the spindles of the prior art. It will also be appreciated that the weight of the spindles of my invention are substantially less than that of the steel spindles so tat they can be more easily handled and transported. The lower weight of a cotton picking machine will also result in less compacting of the soil of the field. Also, less power will be needed to drive both the machine and the spindles. The lower density of the polyurethane spindles also makes the cotton harvesting machines employing the spindles of my invention to be more easily serviced and repaired, greatly reducing gear wear or damage to the steel driving gears for the spindles.

Another feature of my invention resides in the provision of a circumferential groove on the spindle for retaining a collar ring on the spindle. The steel spindles of the prior art are usually rotatably mounted in a bushing and are maintained in place in the bushing on one side by a bevel gear, and on the other side by a retaining ring which is force fit on the shaft of the spindle. Such a force fit retaining ring on the shaft of the spindle makes it difficult to remove and replace a spindle in the field when it is damaged or worn. Also, such a force fit creates tolerance problems. If the ring is pressed too far on the shaft, the spindle may bind; if the ring is not pressed on far enough, the spindle may be too loose and become damaged or cause gear blacklash. In accordance with the polyurethane spindle of my present invention, or spindle made of a material having similar properties, I provide a circumferential annular groove on the shaft of the spindle for receiving a rigid annular collar member for retaining the bushing. The annular collar member may be made of steel, polyurethane or similar material. The polyurethane shaft is sufficiently elastic to permit the snapping on of such a retaining ring but would have sufficient structural strength to retain the collar in place to hold the bushing in position on the spindle and provide better oil retention and dust shielding.

BRIEF DESCRIPTION OF THE DRAWING AND DETAILED DESCRIPTION OF THE PREFERRED EMBODIMENT

The invention will now be described with particular reference to the preferred embodiment shown in the drawing, in which:

FIG. 1 shows the front portion of a cotton picking machine;

FIG. 2 is a horizontal sectional view through the drum portions of the cotton picker machine of FIG. 1 and it shows the spindles in two cotton picker drums in relationship to the picking zone in the cotton picker machine;

FIG. 3 shows the mounting of the spindles within the drums, partly in section;

FIG. 4 shows a preferred embodiment of the spindle of the invention, partly in section; and FIG. 5 shows a sectional view along line 5—5 of FIG. 4.

Referring now to FIGS. 1 and 2, the front portion of a cotton picker machine is generally shown at 10. Cotton plants 11 are shown entering the picking section of machine 10 by way of a passageway between guide means 12, which is only partly shown. The guide means guide cotton plants into a picking zone 13 (see FIG. 2) in the machine. While in the picking zone, the cotton plants are first contacted by cotton picker spindles 14 mounted in a left side drum 15. After being picked by the left drum, the cotton plants come into contact with the right side drum 16. The cotton picked by the spindles is removed from the spindles by doffers 17 (more clearly shown in FIGS. 2 and 3) and blown via conduits 18 by a fan (not shown) into a container (not shown).

Referring particularly to the right side drum 16 in FIG. 2, it is seen that a plurality of cotton picker spindles 14 are mounted on a corresponding number of vertically rotatable picker bars 19. Each picker bar 19 is a hollow chamber (see FIG. 3) and it has a plurality of spindles 14 mounted thereon in a vertical spaced relationship. The picker bars rotate within the drum around a cam 20 and a cam arm 21 to cause the spindles to be perpendicular to the direction of relative travel between the cotton plants and the machine when the spindles are in the picking zone. After the spindles leave the picking zone, they are contacted by a doffer 17 where the cotton on the spindles is removed by the lugs on the doffer. Proceeding beyond the doffer 17, the spindles are then contacted by a moisture applicator 22 to clean the spindles of any dirt and foreign material and to impart moisture to the spindles. The water is supplied to the moisture applicator by supply means 23.

FIG. 3 shows a detailed view, partly in section, of spindles contacting the lugs of the doffers. In FIG. 3, three spindles 14 are seen horizontally mounted in a vertically spaced relationship on a picker bar 19. The left end of spindle 14 terminates in a bevel gear 24 which is rotatably driven by a bevel gear 25 mounted on a vertical shaft 26. Shaft 26 is rotated by drive means (not shown). The rotation of shaft 26 imparts a horizontal rotary motion to the spindles. The center spindle of FIG. 3 is shown partly in section. It can be seen that the spindles are made of a shaft portion 27 having a relatively uniform diameter, a picking portion 28 having a tapered configuration with rows of teeth thereon for picking the cotton, and the bevel gear 24 for transmitting rotary motion to the spindle. The central shaft portion 27 of the spindle is housed in a pair of brass bushings 29. The brass bushings 29 are press fit into a threaded housing 30 for engagement with the picker bar 19. The spindle rotates in the bushings 29 and the housing 30 and is held in position by a collar 32. Collar 32 is force or press fit onto the shaft of the spindle to position and maintain the spindle in the housing.

In FIG. 4, the cotton picker spindle 14 is shown more clearly in detail. The spindle has a central shaft portion 27 which rotates in bushings 29 and housing 30. The spindle terminates at one end in a bevel gear 24 and at the other end in a broached portion 28 having a plurality of rows of teeth 31 thereon (only one row is shown). Near the juncture of the broached portion 28 and the central shaft portion 27 is a circumferential annular groove 33 provided for the retention of an annular collar member 34. The entire spindle is made of a synthetic material which is resilient and elastic so that the annular collar member 34 can be forced into the circumferential groove 33 by a snapping action. Similarly, the collar member 34 can be snapped off manually when repair or replacement of the spindle is necessary.

The collar member 34 can be made of steel, polyurethane or other synthetic materials as indicated above for making the spindle. This collar member acts as an oil retainer and dust shield on the shaft of the spindle as well as a retainer bushing. A collar member made of urethane would provide a better dust shield and oil seal.

FIG. 5 is a partial sectional view of the spindle of FIG. 4 along line 5—5. In this figure, the broached portion 28 of the spindle is shown to have three rows of teeth 31.

As indicated above, the cotton picker spindle of the present invention is made from a synthetic material which is tough, elastic, and having the proper durometer and coefficient of friction properties. It is important that the synthetic material be tough and elastic so that it would yield and then return to its normal position when hit by an extremely hard object, such as rock or metal objects, but it would also be long-wearing. The toughness of the material is particularly important for the teeth-bearing portion of the spindle since the wearing down of the teeth would make the spindle somewhat less effective to pluck the cotton from cotton plants. For this reason, rubber is not suitable as the synthetic material of construction.

The synthetic material must also have the proper durometer range so that the spindle, including the gear portion thereof, will retain its shape and will not be easily deformed by the cotton plants, wood, rocks, or other foreign material. The durometer of the synthetic material should range between 80 Shore A to 80 Shore D.

It is important that the synthetic material possesses the proper abrasion resistance. The material should have a very high coefficient of friction in order to grip the cotton and pluck the same from a cotton plant. On the other hand, the spindle must give up or release the cotton to the doffers. The high abrasion resistance permits a spindle made from the synthetic material to maintain its sharp teeth for the picking action.

It is an important feature of the present invention that a cotton picker spindle is provided which is made of a synthetic material having both the requisite durometer and abrasion resistance properties. Thus, the cotton picker spindle of the invention represents an improvement over the prior art steel spindles not only in that the present spindle needs almost no servicing, but it also has a longer useful life than the steel spindles since the urethane spindles will retain the sharp teeth to grip the cotton from cotton plants for the plucking action longer than the steel spindles. This is a result of the high abrasion resistance of the present spindle and its elasticity. The present spindle can be molded from the above indicated synthetic materials to retain all details from the mold, whereas the steel spindles must be hand-machined.

I have found that polyurethane is uniquely suited as the synthetic material for making the cotton picker spindle of the present invention. Polyurethane has better physical characteristics than rubber for the present purposes. It is elastic and resilient, and it has the proper durometer and abrasion resistance properties. Polyurethane is not subject to deterioration as is the case with steel or rubber. It can be molded to produce a high quality spindle which is extremely long-wearing and efficient for the picking of cotton. Because the cotton picker spindles of the present invention can be molded from polyurethane, or other similar materials as indicated above, the unit cost of the spindle is substantially less than that for conventional steel spindles since the steel spindles must be hand broached to provide the teeth-bearing portion. Moreover, the spindle of the invention can be employed during its lifetime practically without any servicing whatsoever. In contrast, the steel spindles of the prior are must be thoroughly cleaned to remove rust and other foreign objects before the start of the season. In addition, the teeth on the steel spindles must be periodically sharpened so that they will pluck the cotton from its plant. The teeth of the spindle of the present invention will retain the sharp edges for a longer time since they are resilient and abrasion resistant. The use of a flexible spindle made from urethane or other synthetic materials as indicated above will permit the use of a rigid doffer in the cotton picking machine. Heretofore, doffers must be flexible to engage the rigid steel spindles. The flexible doffers are made by coating a metallic base with a flexible synthetic material such as rubber. A rigid doffer can be molded from metal and it would be relatively inexpensive to manufacture. Such a rigid doffer would also have longer service life.

A spindle made of polyurethane or like material will have a gear 24 which is more resilient than steel and thus will require less alignment with metallic drive gears. The urethane to metal contact will result in less wear on the parts than that from the use of prior art steel spindles.

The addition of a spindle of the invention will permit bronze bushings to be employed on the shaft in the event bushings are used. The spindle of the invention may also be mounted in a housing without the use of bushings to thereby reduce the cost of manufacture. When no bushings are employed, the bearing surfaces between the spindle and the shaft housing can be lubricated by a lubricant which will be retained by the collar member.

The invention has been described in detail with particular reference to preferred embodiments thereof, but it will be understood that variations and modifications can be effected within the spirit and scope of the invention as described hereinabove and as defined in the appended claims.

What is claimed is:

1. In a cotton picker spindle having a central shaft portion, means connected to said central shaft portion for engagement with a rotating means to rotate said spindle, and a teeth-bearing portion connected to said central shaft portion for mechanically removing cotton from the boll of a cotton plant, the improvement comprising a spindle made from a synthetic material which is tough, elastic, and having a durometer ranging from about 80 Shore A to 80 Shore D.

2. Cotton picker spindle according to claim 1 wherein said synthetic material is polyurethane.

3. A cotton picker spindle comprising a central shaft portion, means connected to said central shaft portion for engagement with a rotating means to rotate said spindle, a teeth-bearing portion connected to said central shaft portion for mechanically removing cotton from a cotton plant, and a circumferential groove on said spindle for maintaining a snap-on collar in place, said spindle being made from a synthetic material which is tough, elastic, and having a durometer ranging from about 80 Shore A to 80 Shore D.

4. Cotton picker spindle according to claim 3 wherein said synthetic material being polyurethane.

5. In a cotton picker having a cotton picker spindle for mechanically removing cotton from the boll of a cotton plant and a doffer for removing the picked cotton from said spindle, the improvement comprising in combination, a flexible spindle made from a synthetic material which is tough, elastic, and having a durometer ranging from about 80 Shore A to 80 Shore D, and a doffer having substantially rigid surfaces for contact with said flexible spindle.

6. The combination of claim 5 wherein said synthetic material is polyurethane.

7. The combination of claim 5 wherein said spindle has a circumferential groove thereon for maintaining a snap-on collar in place.

8. The combination of claim 7 wherein said synthetic material is polyurethane.

References Cited

UNITED STATES PATENTS

| | | | |
|---|---|---|---|
| 2,787,109 | 4/1957 | Lindsay | 56—50 |
| 2,837,886 | 6/1958 | Beech et al. | 56—42 |

RUSSELL R. KINSEY, Primary Examiner